Patented Nov. 14, 1939

2,180,129

UNITED STATES PATENT OFFICE 2,180,129

MANUFACTURE OF ELECTRIC FUSEHEADS SUCH AS ARE USED, FOR EXAMPLE, IN BLASTING DETONATORS

Wilfrid Taylor and Cecil Robert Lovett Hall, Saltcoats, Scotland, assignors to Imperial Chemical Industries Limited, a corporation of Great Britain No Drawing. Application May 9, 1938, Serial No. 206,962. In Great Britain May 18, 1937

6 Claims. (Cl. 148—6)

The present invention relates to the manufacture of composite sheets of the kind in which a thin electrically-conductive material is cemented to a non-conducting material and particularly to the manufacture of electric fuseheads such as are used, for example, in blasting detonators, by processes of the kind in which a thin electrically-conductive coating of metal is cemented on each side of a stout strip of non-conducting material, and the opposite strip is open divided into a number of separate units, to whose metal surfaces the leading wires are subsequently attached.

A common method of manufacturing fuseheads consists in stamping out comb-like structures from a sheet of pressboard glued on each side to the zinc face of an electro-deposited composite sheet consisting of a layer of zinc and a layer of nickel, dipping the toothed edges of the combs into a paste comprising a suitable inflammable composition and a cement; subsequently severing each individual tooth together with its bead of igniting composition from the dried combs, and soldering an insulated connecting wire to each side of each tooth.

In the manufacture of low-tension fuseheads according to this process and before the dipping operation is carried out, a bridge of fine resistance wire is soldered across the tip of each tooth so that it connects the strips of metal foil on each side of the tooth.

A disadvantage of the above-described process is that the electrolytically-deposited metal coating hitherto employed is brittle and weak. The heat of the soldering iron used in soldering the conducting wires to the coating adversely affects the glue by which it is cemented to the pressboard, and the strains involved in subsequently providing the fuseheads with their insulating sheath of sulphur or the like sometimes lead to cracking of the metal coating, with consequent risk of completely or intermittently faulty contacts to the tip of the fusehead.

This invention has as an object to devise a method of cementing brass to another material. A further object is to devise a method whereby brass can be cemented to another material to provide a bond which will withstand subsequent processing, such as stamping, soldering, and processes involving bending. A still further object is to devise a method of manufacturing composite strips suitable for the manufacture of fuseheads. A still further object is to devise a simpler method of manufacturing fuseheads. A still further object is to provide new composite materials. A still further object is to provide new composite strips suitable for use in the manufacture of fuseheads. Further objects will appear hereinafter. These objects are accomplished by the following invention.

We have found that metal-foil-coated sheets or boards of insulating material, suitable for the manufacture of electric fuseheads for blasting detonators, can be manufactured by a process which consists in preparing one face of a sheet of rolled brass foil by an etching treatment and thereafter attaching the foil by its prepared surface to a sheet or board of insulating material by means of a thermoplastic cement. A special etching process is necessary, since mechanically clean brass foil, or brass foil which has merely been treated with dilute acid, provides a bond from which the foil can easily be stripped after cementing.

The etching process used in the present invention consists in exposing the brass foil on the side to be cemented to the pressboard, to the chemical action of aqueous ammonia under oxidising conditions for a period of time such that a black coating is formed over the surface. The exposed surface is then subjected to the action of an aqueous solution of ammonium chloride or other slightly acidic salt until the whole of the black colour of the coating has been discharged, and if necessary the surface is then subjected to abrasive or similar action so as to dislodge the remaining coating and is thoroughly washed in water and dried. The brass foil may conveniently be about one and a half thousandths of an inch in thickness.

The invention is further illustrated by the following example, in which the parts are parts by weight.

Example

A pair of sheets of brass foil 1.5 thousandths of an inch thick are juxtaposed in contact over their whole surfaces and laid upon a flexible spacing frame-work made of Monel metal mesh work, and the assembly is wrapped up into a spiral placed on a reciprocating spindle which dips it alternately into and out of a bath of 12% ammonia for 2 to 5 minutes; whereupon it is allowed to drain for a few minutes and is then introduced to a bath of 25% ammonium chloride solution at 85° C. in which it is kept moving for about two minutes, by which time the black deposit is no longer evident. The coil is then rinsed in running water and is uncoiled and the lengths of foil are then treated in a bath of 5% ammonium chloride solution at about 40° C., while the etched surface is rubbed to assist in dislodging the green product adhering to it. The sheets are then thoroughly washed in water, and are then dried at a raised temperature.

The etched surfaces are then coated with a 20% solution of the polyvinyl acetate sold under the name "Mowilith H" dissolved in a mixture of benzene and industrial spirits (30:70 by volume) so that 0.44 gm. of vinyl acetate polymer is extended over 100 square cm. of each brass sheet. The solution is dried off at a raised temperature, and the sheets are stacked when cold.

Suitable areas of the cemented sheets are then assembled with an interposed pressboard layer in a cementing position and subjected to pressure in a steam-heated press provided with pressure-steam heating and cooling arrangements, under a pressure of about 16 kg. per square cm. at 130° C. and until the assembly has cooled. Combs may then be stamped out of the assembly, and steps cut in the tips of one side of each comb as described in copending British application No. 13,906/37.

The manufacture of the low-tension fuseheads may then be completed in known manner.

As a thermoplastic cement a solution of polyvinyl acetate in a volatile organic solvent such as a mixture of benzene and alcohol may be applied to the foil; and has the advantage that, when dried off, the coating is not tacky at room temperature, so that the sheets may be stored coiled up.

Alternatively we could have used any of the following thermoplastic resins: Polyvinyl chloride, polyvinyl phthalate, polyvinyl acetal, polymethyl acrylate, polymethyl methacrylate, polyethyl acrylate, polyethyl methacrylate, or mixtures or interpolymers of the substances with each other or with polyvinyl acetate. Benzyl cellulose and chlorinated rubber may also be used. We may also use any thermo-hardening adhesive resin, such as, a phenol-formaldehyde or a polyhydric alcohol polybasic acid condensation product.

In carrying out the etching process it is convenient to place two strips of the brass foil in contact and roll them up in a spiral with a reticulated spacer adapted to maintain the sheets of foil in contact on the inner surfaces and thus substantially to prevent the access of liquid to the juxtaposed surfaces while permitting the access of the liquids to the exposed surfaces. Monel metal chain work may conveniently be used for this purpose.

The aqueous ammonia employed may be aerated if desired, and is effective in dilute solution; and the surfaces to be treated may be allowed access to the atmosphere for some minutes before the application of the discharging salt solution, which is conveniently applied hot, e. g., at about 85° C. The treatment with the discharging salt solution may be carried out in two stages with an intermediate washing, the first while the juxtaposed surfaces are still kept in contact, and the second, after they have been separated, with a more dilute solution. In this manner the portions of the surface previously masked by the spacer are rendered available to the action of the discharging salt. The sheets may be rubbed while they are being washed in the second bath to assist in the removal of the green product into which the black coating is converted by the discharging salt. They are then washed thoroughly in water and rapidly dried to avoid tarnishing.

Instead of ammonium chloride we could have used concentrated caustic potash, concentrated caustic soda, or any other substance which will remove the copper oxide coating without damaging that quality of the etched surface which gives the good adhesion with the thermoplastic cement.

The thermoplastic cement may be applied to the etched surfaces for instance by means of a volatile solvent, and the cemented faces of the foil are then assembled with the pressboard sheet and caused to adhere thereto by the application of pressure at a raised temperature. The cement may however be applied to the pressboard if desired instead of to the etched metal surfaces.

This invention is a valuable advance in the art, as by its use we can make sheets, having metal coatings on each side of insulating material, which can be stamped out into combs, or subjected to the heat of a soldering iron, or bent, without impairing the properties of the fuseheads made therefrom; particularly they may be rebated in a rebating machine as described in our copending British application No. 13,906/37.

As many apparently widely different embodiments of this invention may be made without departing from the spirit and scope thereof, it is to be understood that the invention is not limited to the specific embodiments thereof, except as defined in the appended claims.

We claim:

1. A process for the manufacture of metal-foil-coated sheets of insulating material which comprises submitting at least one face of a sheet of rolled brass foil to an etching treatment and thereafter securing that face to the insulating material by means of a thermoplastic cement.

2. A process as claimed in claim 1 in which the etching treatment comprises treating the foil with aqueous ammonia under oxidising conditions until an oxidised coating forms, treating the oxidised coating with a substance which will remove this coating without damage to the surface of the foil beneath the coating.

3. A process as claimed in claim 1 in which the thermoplastic cement is polyvinyl acetate.

4. A process as claimed in claim 1 in which the etching treatment comprises treating the foil with aqueous ammonia under oxidising conditions until an oxidised coating forms and treating the oxidised coating so formed with a solution of a substance of the class which consists of ammonium chloride, caustic soda, and caustic potash, and mechanically removing the treated coating to expose the clean metallic surface of the foil.

5. A process for the manufacture of metal coated sheets of insulating material which comprises submitting at least one face of a rolled brass sheet to an etching treatment and thereafter securing that face to the insulating material by means of a thermoplastic cement.

6. A process for the manufacture of metal-foil-coated sheets of insulating material which comprises submitting at least one face of a sheet of brass foil to an etching treatment and thereafter securing that face to the insulating material by means of a thermoplastic cement.

WILFRID TAYLOR.
CECIL R. L. HALL.

CERTIFICATE OF CORRECTION.

Patent No. 2,180,129.  November 14, 1939.

WILFRID TAYLOR, ET AL.

It is hereby certified that error appears in the printed specification of the above numbered patent requiring correction as follows: Page 1, first column, line 10, for "opposite strip is open divided" read composite strip is then divided; same page, second column, line 49, for the word "to" read into; and that the said Letters Patent should be read with this correction therein that the same may conform to the record of the case in the Patent Office.

Signed and sealed this 19th day of December, A. D. 1939.

Henry Van Arsdale,
Acting Commissioner of Patents.

(Seal)

CERTIFICATE OF CORRECTION.

Patent No. 2,180,129. November 14, 1939.

WILFRID TAYLOR, ET AL.

It is hereby certified that error appears in the printed specification of the above numbered patent requiring correction as follows: Page 1, first column, line 10, for "opposite strip is open divided" read composite strip is then divided; same page, second column, line 49, for the word "to" read into; and that the said Letters Patent should be read with this correction therein that the same may conform to the record of the case in the Patent Office.

Signed and sealed this 19th day of December, A. D. 1939.

Henry Van Arsdale,
Acting Commissioner of Patents.

(Seal)